Feb. 25, 1936.   J. MIKULASEK   2,032,297

COUPLING

Filed Dec. 3, 1934

John Mikulasek
INVENTOR

BY Victor J. Evans & Co.
ATTORNEY

Patented Feb. 25, 1936

2,032,297

UNITED STATES PATENT OFFICE 2,032,297

COUPLING

John Mikulasek, Newton, Iowa, assignor to Vaclav Losa, Coraopolis, Pa.

Application December 3, 1934, Serial No. 755,804

1 Claim. (Cl. 285—75)

This invention relates to couplings for tubular members, such as pipes, hose, flexible tubes or conduits and its object is to provide a coupling the members of which may be easily fitted together and will firmly hold together when engaged but may be easily separated when necessary or desired. A further object is to provide a coupling which will prevent leaking, and a still further object is to provide a coupling of simple and durable construction which is not apt to get out of order. These stated objects, and other objects which will appear as the description proceeds, are attained in such a device as is illustrated in the accompanying drawing, and the invention resides in certain novel features which will be particularly defined in the appended claim.

Figure 1:
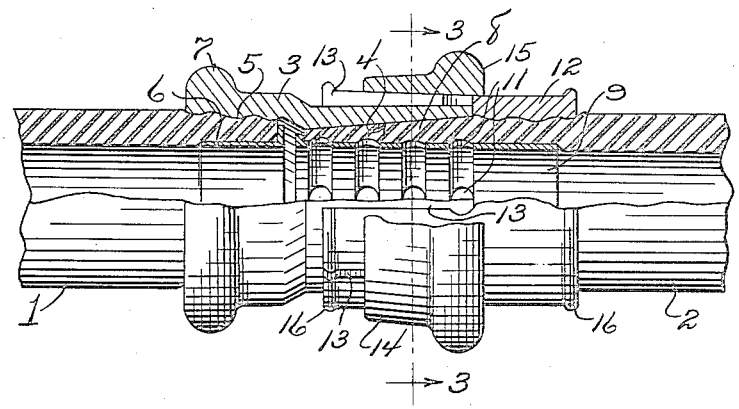
Figure 1 is a view of the improved coupling, partly in elevation and partly in longitudinal section.

The drawing shows the coupling attached to the meeting ends of hose sections 1, 2. The female member 3 of the coupling consists of a metal sleeve having a preferably flared bore 4 in one end portion and having its bore in the other end portion formed with transverse or circumferential corrugations or grooves, as indicated at 5, the end of the hose section being received in the corrugated end of the coupling member. A ferrule 6 is inserted into the open end of the hose section and expanded whereby the hose is compressed between the ferrule and the coupling so as to conform to and embed the corrugations so that the member 3 will be firmly secured and cannot pull out of the hose. To facilitate the handling of the coupling member, it is provided with an annular flange or bead 7 at its hose-engaging end. While various known means for attaching the coupling to the hose may be employed the means shown and described is simple and easily applied and provides a passage of uniform diameter through the device.

Figure 2:
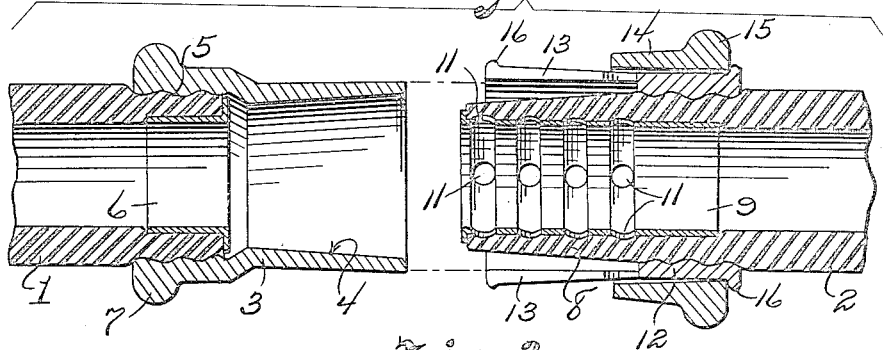
Figure 2 is a longitudinal section showing the members of the coupling separated.
Figure 3:
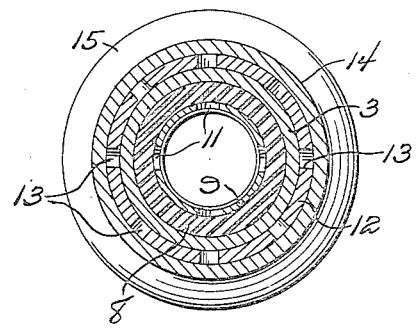
Figure 3 is a transverse section on the line 3—3 of Figure 1.

The male member of the coupling comprises a preferably tapered elastic nipple 8 secured to or formed integral with the hose section 2, the external taper of the nipple being on the same angle of inclination as the flare of the member 3. A somewhat elongated ferrule 9 is forced into the bore of the nipple and is formed with transverse corrugations 10 whereby it will embed itself and be firmly retained in the nipple. The ferrule is also formed with openings 11, through the corrugations, the purpose of which will presently appear. Fitted externally upon the nipple about the inner end of the ferrule is a collar 12 from which a plurality of resilient fingers 13 extend to the end of the nipple in spaced relation thereto, the fingers increasing in thickness toward their free ends, as shown in Figures 1 and 2, and a ring 14 is slidably mounted on the collar 12 and the fingers, the inner circumferene of the ring being slightly flared in accordance with the increase in thickness of the fingers. The ring is formed with a flange or bead 15 to facilitate handling, and flanges 16 on the collar 12 and fingers 13 prevent the ring from moving off the same.

When the members of the coupling are to be engaged, they are brought together as shown in Figure 1, the nipple 8 entering and fitting snugly in the flared bore of the member 3. The ring 14 is then pushed forward from the position shown in Figure 2 to the position shown in Figure 1, thereby compressing the fingers about the member 3 and effecting a strong frictional clamping engagement of the fingers with said member. The flared formation of the member 3 and the tapered formation of the nipple causes a binding wedging engagement between said elements which will aid in holding the members of the coupling together and will also resist leakage under normal pressure. Should the pressure in the hose increase, the pressure will act through the openings 11 to expand the nipple outwardly against the bore 4, thereby more firmly binding the parts together and increasing the leak-proof quality of the coupling, and the transverse corrugations form annular spaces for the fluid to enter circumferentially between the ferrule and the hose. While the parts will firmly hold together when engaged, they may be readily separated if the ring 14 be slid back from the ends of the fingers.

Having described my invention, what I claim is:

A coupling comprising a sleeve having a flared bore, a tapered elastic nipple to fit within the tapered bore of the sleeve, a perforated ferrule fitted in the nipple and having transverse corrugations, a collar fitted around the base of the nipple, resilient fingers extending from the collar to encircle the sleeve, and means to compress the fingers about the sleeve.

JOHN MIKULASEK.